US012734599B2

(12) United States Patent
Wang et al.

(10) Patent No.: US 12,734,599 B2
(45) Date of Patent: Sep. 15, 2026

(54) METHOD AND AUTOMATIC BRAZING APPARATUS FOR FLAME BRAZING CONTROL IN COPPER-ALUMINUM WELDING

(71) Applicants: SHAOXING DAISHIN XINRUI BRAZING EQUIPMENT CO., LTD., Shaoxing (CN); ZHEJIANG XINRUI BRAZING TECHNOLOGY CO., LTD., Shengzhou (CN)

(72) Inventors: Shuiqing Wang, Shaoxing (CN); Kan Cao, Shaoxing (CN); Qiang Liang, Shaoxing (CN); Kang Xu, Shaoxing (CN); Xiyun Wang, Shaoxing (CN); Yinbin Lou, Shaoxing (CN)

(73) Assignees: SHAOXING DAISHIN XINRUI BRAZING EQUIPMENT CO., LTD., Shaoxing (CN); ZHEJIANG XINRUI BRAZING TECHNOLOGY CO., LTD., Shengzhou (CN)

( * ) Notice: Subject to any disclaimer, the term of this patent is extended or adjusted under 35 U.S.C. 154(b) by 55 days.

(21) Appl. No.: 18/552,587

(22) PCT Filed: Dec. 30, 2022

(86) PCT No.: PCT/CN2022/143866

§ 371 (c)(1),
(2) Date: Sep. 26, 2023

(87) PCT Pub. No.: WO2023/155615

PCT Pub. Date: Aug. 24, 2023

(65) Prior Publication Data

US 2024/0173788 A1 May 30, 2024

(30) Foreign Application Priority Data

Feb. 21, 2022 (CN) ........................ 202210158693.1

(51) Int. Cl.
*B23K 3/04* (2006.01)
*B23K 5/00* (2006.01)
(Continued)

(52) U.S. Cl.
CPC ................ *B23K 3/043* (2013.01); *B23K 5/00* (2013.01); *B23K 2101/06* (2018.08); *B23K 2103/18* (2018.08)

(58) Field of Classification Search
None
See application file for complete search history.

(56) References Cited

U.S. PATENT DOCUMENTS 3,948,496 A * 4/1976 Miller ..................... F23D 14/42 266/48
5,222,654 A * 6/1993 Oki ....................... B23K 20/04 228/205
(Continued)

FOREIGN PATENT DOCUMENTS

CN 2222027 Y * 3/1996
CN 112122728 A * 12/2020 .............. B23K 1/20
(Continued)

OTHER PUBLICATIONS

PCT/CN2022/143866—International Search Report and Written Opinion mailed on Jun. 8, 2023, 13 pages.

*Primary Examiner* — Devang R Patel
(74) *Attorney, Agent, or Firm* — Getech Law LLC; Jun Ye

(57) ABSTRACT

Disclosed is a flame brazing control method for copper-aluminum welding, characterized by using a flame generated from the combustion of natural gas, air and oxygen as the heat source, the molar flow ratio of natural gas, air and oxygen is controlled within a range of 1:10-22:0.3-2.2. Further disclosed is an automatic brazing apparatus for copper-aluminum welding, characterized by using a flame
(Continued)

generated from the combustion of natural gas, air and oxygen as the heat source, includes three gas delivery systems for natural gas, air and oxygen, a mixer for mixing the three gas, and integrated flow controllers for the electromagnetic valves and flow valves in the three gas delivery systems.

4 Claims, 3 Drawing Sheets

(51) Int. Cl.
*B23K 101/06* (2006.01)
*B23K 103/18* (2006.01)

(56) References Cited

U.S. PATENT DOCUMENTS

| | | | | |
|---|---|---|---|---|
| 5,509,600 | A * | 4/1996 | Okada | B23K 20/023 228/205 |
| 5,901,897 | A * | 5/1999 | Takahashi | B23K 3/08 228/8 |
| 2019/0160573 | A1* | 5/2019 | Edenfield | B23K 3/022 |

FOREIGN PATENT DOCUMENTS

| | | | | | |
|---|---|---|---|---|---|
| CN | 114273742 | A | | 4/2022 | |
| FR | 2337607 | A1 | | 8/1977 | |
| FR | 2337607 | A | * | 9/1977 | F23D 14/72 |
| KR | 20090100755 | A | * | 9/2009 | B23K 3/04 |

* cited by examiner (a) (b) (c) (d)

METHOD AND AUTOMATIC BRAZING APPARATUS FOR FLAME BRAZING CONTROL IN COPPER-ALUMINUM WELDING

CROSS-REFERENCE TO RELATE APPLICATIONS

This application is a 371 of international patent application PCT/CN2022/143866, filed Dec. 30, 2022, which claims priority to foreign application CN 202210158693.1, filed Feb. 21, 2022. The contents of each of the above-captioned patent applications are hereby expressly incorporated herein by reference in their entireties.

TECHNICAL FIELD

The present invention relates to the field of automatic flame brazing apparatus, and more specifically, it pertains to a method and an automatic brazing apparatus for flame brazing control in copper-aluminum welding.

BACKGROUND

Aluminum, with the density being one third of that of copper, features not only light weight, but also low price. With the trend of replacing copper with aluminum, copper and aluminum are connected to form a composite structure, so that advantages of copper and aluminum can be exerted, and the composite structure has wide applications such as heating appliances, air conditioners and refrigerating industries. Flame brazing is an essential method for achieving copper-aluminum connection. Flame brazing means that by utilizing the characteristic that the melting point of a brazing material is lower than that of a weldment metal, the brazing material is heated to a range of temperature higher than the melting point of the brazing material but lower than that of a weldment metal, the brazing material is melted and is metallurgically reacted with the weldment metal, and the brazing material infiltrates the weldment metal by means of capillary action to realize connection.

In existing flame brazing techniques, a flame ignited by a mixture of combustible gas and compressed air or pure oxygen is used as the heat source for heating. The control of the flame is a critical factor affecting the quality of brazing.

CN102259220A discloses a digital display aluminum heat exchanger flame brazing device with precise and controllable flow, that employs a flame generated from the combustion of liquefied petroleum gas and compressed air as the heat source. The flows of the liquefied petroleum gas and air are stably, precisely and sensitively controlled by using a digital display precise mass flow meter.

CN102615368A reveals a method for controlling a flame brazing machine that uses air or oxygen as the combustion-assisting gas. The flows of the combustion-assisting gas and a fuel gas are detected by utilizing a flow sensor, the actual combustion temperature is detected by utilizing a temperature sensor, and meanwhile, the ratio of the combustion-assisting gas to the fuel gas and the combustion temperature thereof are controlled.

CN105397232A introduces an intelligent pressure and flow stabilizing control system for flame brazing, where a flame ignited by the mixture of liquefied gas and oxygen is used as the heat source, with a programmable controller respectively connected to an oxygen mass flow controller and a liquefied gas mass flow controller. The system automatically record and store welding parameters to standardize the welding parameters and automatically adjust the flame size through the mass flow controller.

CN110773833A discloses an automatic flame brazing machine for automobile air conditioner heat exchanger, An air control system provides stable and adjustable air for flame combustion, A fuel gas control system provides a fuel gas with precisely controlled flow for flame combustion. A PLC control system controls the gas flow by a gas mass flow meter. The adjusted air and fuel gas are uniformly mixed in a mixer and then delivered to the welding gun system.

CN213945208U presents a flame brazing device, wherein opening degree of valves on oxygen and fuel gas pipeline are controlled by a controller, and parameters in a production process are quantified, so as to ensure full combustion of the gas.

Due to significant differences in physical and chemical properties of copper and aluminum, copper-aluminum welding poses significant challenges. It is found by the applicant in practice that when an automatic flame brazing machine is adopted to weld copper and aluminum, a flame generated by using oxygen as a combustion-assisting gas tends to cause overheating or underheating of aluminum components and uneven penetration of a brazing material; and a flame generated by using air as a combustion-assisting gas can adversely affect the crystallographic structure of copper components, significantly impacting welding quality.

There is an urgent need to develop a flame brazing control method suitable for copper-aluminum welding and an automatic welder thereof.

SUMMARY

To solve the problems in the prior art, the present invention provides a flame brazing control method for copper-aluminum welding and an automatic welder thereof, which aims to overcome the defects of aluminum components overheating or underheating, uneven penetration of brazing material, and changes in crystallographic structure of copper components, and improve the welding quality, qualified rate and welding efficiency.

After extensive experimentation and in-depth research, the applicant found that the main reasons for aluminum components overheating or underheating and uneven penetration of brazing materials lie in that the close melting point of the aluminum and the brazing material, with a temperature difference of only about 50° C., and the oxygen assisting combustion results in a powerful and high heat value flame, making it difficult to control the heating time; the air assisting combustion results in a milder and lower heat value flame, leading to longer heating time, causing recrystallization and grain growth in the copper material, which adversely affects its properties.

Therefore, on the one hand, the present invention provides a flame brazing control method for copper-aluminum welding, characterized by using a flame generated from the combustion of natural gas, air and oxygen as the heat source, the molar flow ratio of natural gas, air and oxygen is controlled within a range of 1:10-22:0.3-2.2.

In a preferred embodiment, a higher molar flow ratio of oxygen to natural gas is adopted during preheating compared to welding.

In another preferred embodiment, during the preheating of copper components, the molar flow ratio of natural gas, air and oxygen is controlled within a range of 1:15-22:1-2.2; while during the preheating of aluminum components, the ratio is controlled within a range of 1:10-22:0.3-1.5; and during welding, the ratio is controlled within the range of 1:10-22:0.3-1.5.

In a specific preferred embodiment, the molar flow rate ratio is set as follows: 1:20:2 for preheating copper components, 1:20:1 for preheating aluminum components, and 1:20:0.8 during welding.

On the other hand, the present invention provides an automatic brazing apparatus for copper-aluminum welding, characterized by using a flame generated from the combustion of natural gas, air and oxygen as the heat source, includes three gas delivery systems for natural gas, air and oxygen, a mixer for mixing the three gas, and integrated flow controllers for the electromagnetic valves and flow valves in the three gas delivery systems.

In a preferred embodiment, the gas delivery systems include filters, ball valves, pressure sensors, pressure-reducing valves with a gauge, precision filters and check valves.

In another preferred embodiment, the apparatus includes a pulse igniter, a spark pin and an ignition nozzle.

In a preferred embodiment, the apparatus includes a gas distribution component connected to the mixer, branch pipes and burner.

Furthermore, in a preferred embodiment, the burner includes a copper core and a stainless steel sleeve.

Moreover, in a specific preferred embodiment, the burner outlet includes a larger central hole and four smaller holes around it.

By using a flame generated from the combustion of natural gas, air, and oxygen as the heat source, the present invention overcomes the defects of overheating or underheating of aluminum components, uneven penetration of brazing materials, and changes in crystallographic structure of copper components in copper-aluminum flame brazing. Moreover, the precise control of flame intensity, shape, heat value, and stability is achieved by the three gas delivery systems, gas mixer, and integrated flow controllers. The invention enhances welding quality, qualified rate, and welding efficiency, achieving a first-time pass rate of over 99%.

DETAILED DESCRIPTION

Below, in combination with the drawings, specific embodiments of the present invention will be described in detail.

The present invention provides a flame brazing control method for copper-aluminum welding, using a flame generated from the combustion of natural gas, air and oxygen as the heat source. When the oxygen flow is low, the firepower of flames is small, and the heating time is relatively long, which can adversely affect the crystallographic structure of copper components, causing severe oxidation and affecting the properties of the weldment. When the oxygen flow is sufficient, it may lead to burning loss of aluminum components and the formation of gas holes on the brazing material surface and the like. When the oxygen flow is too low, the surface of the weldment may become blackened, there are many scales on the surface of copper components, and the strength of the copper components is reduced, so that the welding quality is affected. Through repeated experiments, it is preferred to control the molar flow rate ratio of natural gas, air, and oxygen within the range of 1:10-22:0.3-2.2 when using a flame generated from the combustion of natural gas, air, and oxygen as the heat source for copper-aluminum welding. In a preferred embodiment, a higher molar flow ratio of oxygen to natural gas is adopted during pre-heating compared to welding, which can further improve welding quality and the welding efficiency while ensuring the welding qualified rate. In another preferred embodiment, during the preheating of copper components, the molar flow ratio of natural gas, air and oxygen is controlled within a range of 1:15-22:1-2.2; while during the preheating of aluminum components, the ratio is controlled within a range of 1:10-22:0.3-1.5; and during welding, the ratio is controlled within the range of 1:10-22:0.3-1.5. In a more preferred embodiment, the molar flow rate ratio is set as follows: 1:20:2 for preheating copper components, 1:20:1 for preheating aluminum components, and 1:20:0.8 during welding.

Figure 1:
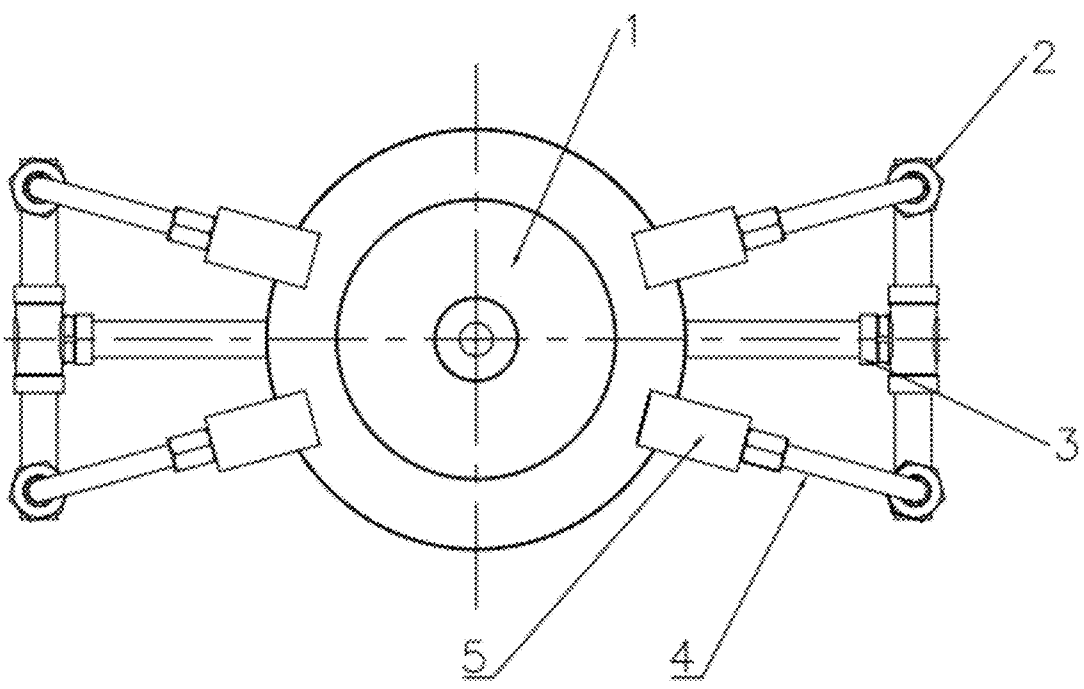
FIG. 1 is a top view of the burner and torch component of an automatic brazing apparatus for copper-aluminum welding according to the present invention.
Figure 2:
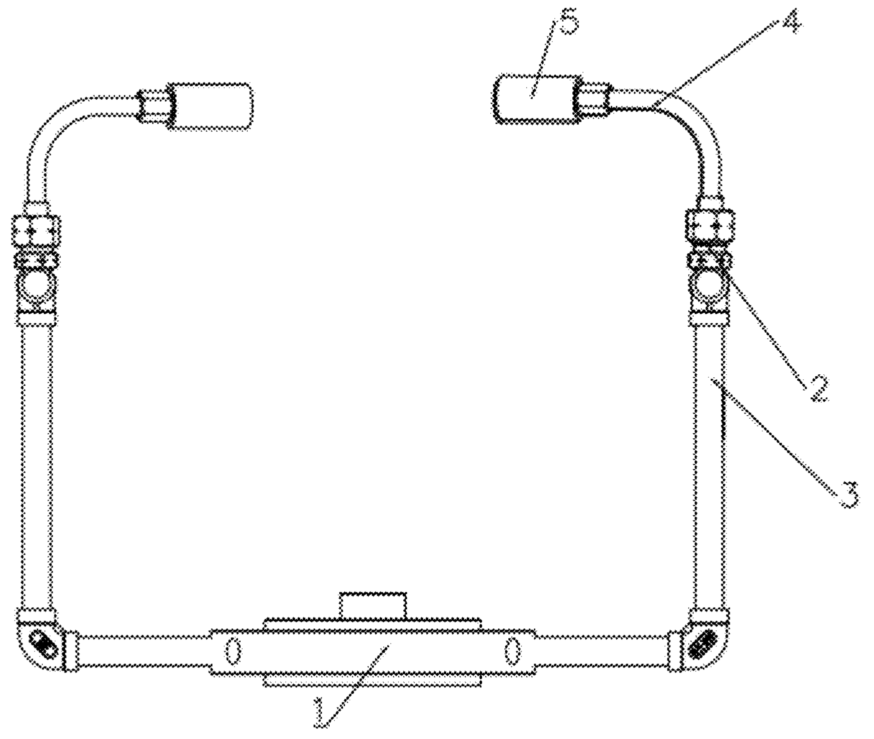
FIG. 2 is a side view of the burner and torch component of an automatic brazing apparatus for copper-aluminum welding according to the present invention.
Figure 3:
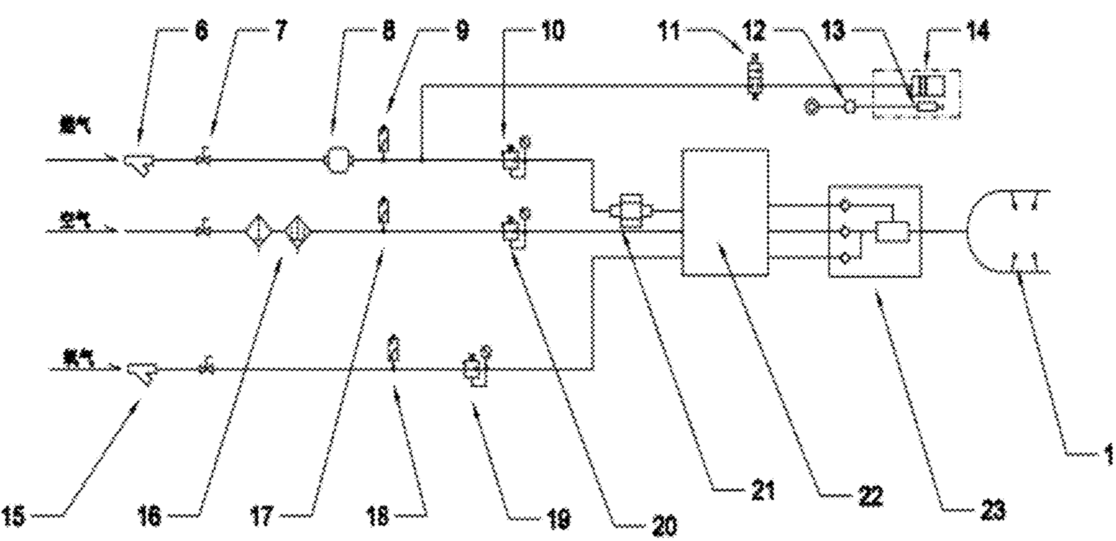
FIG. 3 is a schematic diagram of a gas delivery system for natural gas, air and oxygen used inan automatic brazing apparatus for copper-aluminum welding according to the present invention.

Referring to FIGS. 1-3, an automatic brazing apparatus for copper-aluminum welding according to the present invention includes a gas distributing component 1, wherein an inlet is connected with a mixer for mixing natural gas, air and oxygen. A ferrule connector 2 is used to adjust the angle of the burner. It further includes a gas distributing tube 3, a branch pipe 4 and a burner 5.

An appropriate burner structure should ensure both the concentration of the flame to improve heating efficiency and the dispersion of the flame to enhance heating uniformity. Through repeated experiments, it is preferred to use a burner 5 with a copper core and a stainless steel sleeve for copper-aluminum welding using a flame generated from the combustion of natural gas, air, and oxygen as the heat source. In a more preferred embodiment, a burner structure with a larger central hole and four smaller holes around it is adopted.

In a preferred embodiment, an automatic brazing apparatus for copper-aluminum welding according to the present invention includes a gas delivery system for natural gas, air and oxygen, a mixer 23 for mixing natural gas, air and oxygen, and an integrated flow controller 22 for flow valves in the three gas delivery systems. Each gas delivery system is equipped with a pressure-reducing valve, a ball valve, a filter and a pressure sensor. The gas delivery system for a fuel gas includes a filter 6, a ball valve 7, a filter 8, a pressure sensor 9, a pressure-reducing valve with a gauge 10 and a precision filter 21 in sequence. The gas delivery system for air includes a filter 16, a pressure sensor 17 and a pressure-reducing valve with a gauge 20 in sequence. The gas delivery system for oxygen includes a filter 15, a pressure sensor 18 and a pressure-reducing valve with a gauge 19 in sequence. An electromagnetic valve 11, a pulse igniter 12, a spark pin 13 and an ignition nozzle 14 provide automatic ignition functionality, and automatic extinguishing is provided for safety during use. The integrated flow controller 22 integrates electromagnetic valves and flow valves for each gas delivery system, and a PLC controller controls the switching states of the electromagnetic valves and the flow rate of the flow valves. A mixer 23 for mixing natural gas, air and oxygen is equipped with a check valve, etc.

The present invention will be further illustrated below in combination with specific examples and comparative examples. These exemplary embodiments are merely illustrative of the present invention and are not intended to limit the scope of the present invention.

Example 1

On an automatic flame brazing apparatus, a flame generated from the combustion of natural gas, air, and oxygen is used as the heat source, with four air burners. The natural gas flow is set to 7 L/min, the air flow is set to 118 L/min, and the oxygen flow is set to 6 L/min. An aluminum-silicon-copper flux-cored wire, and copper-aluminum brazing paste are used. Four air burners with appropriate spacing are used to braze a 19 mm diameter copper tube to an aluminum base with a swinging distance of 10 mm. The copper tube is preheated for 6 seconds, the aluminum base is preheated for 14 seconds, and the wire feeding and welding time is 6 seconds, totally 26 seconds.

Comparative Example 1

On an automatic flame brazing apparatus, a flame generated from the combustion of natural gas and air is used as the heat source, with a natural gas flow of 7 L/min and an air flow of 140 L/min. The oxygen flow is closed. An aluminum-silicon-copper flux-cored wire, and copper-aluminum brazing paste are used. Four air burner with appropriate spacing are used to braze a 19 mm diameter copper tube to an aluminum base with a swinging distance of 10 mm. The copper tube is preheated for 7.5 seconds, the aluminum base is preheated for 17 seconds, and the wire feeding and welding time is 6.5 seconds, totally 31 seconds.

Comparative Example 2

Figure 4:
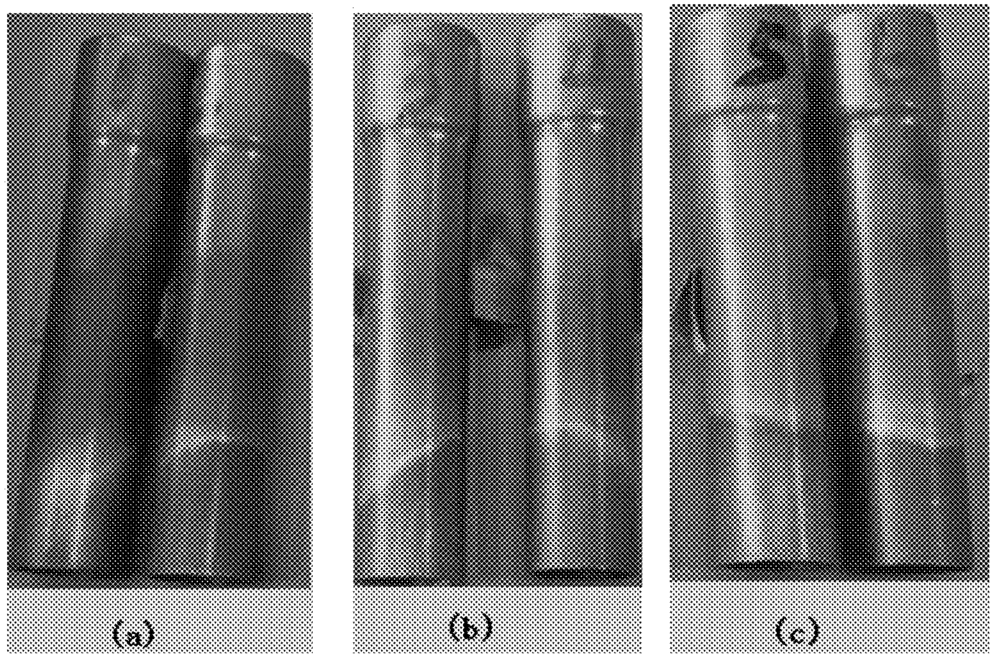
FIG. 4 shows photos of color changes on the surfaces of copper tubes after copper-aluminum welding using different combustion-assisting gases.

On an automatic flame brazing apparatus, a flame generated from the combustion of natural gas and air is used as the heat source, with a natural gas flow of 3.5 L/min and an air flow of 70 L/min. Tow acetylene #7 burners with spacing of 130 mm are used to heat a 19 mm diameter copper tube to 600° C. for test with a swinging distance of 10 mm. The heating time is 15 seconds. The photos of color changes of the copper tube surface after cooling are shown in FIG. 4(*a*), indicating severe blackening on the surface.

Example 2

On an automatic flame brazing apparatus, a flame generated from the combustion of natural gas, air and oxygen is used as the heat source, with a natural gas flow of 3.5 L/min, an air flow of 70 L/min and an oxygen flow of 7 L/min. Tow air burners with spacing of 110 mm are used to heat a 19 mm diameter copper tube to 600° C. for test with a swinging distance of 10 mm. The heating time is 11 seconds. The photos of color changes of the copper tube surface after cooling are shown in FIG. 4(*b*).

Comparative Example 3

On an automatic flame brazing apparatus, a flame generated from the combustion of natural gas and oxygen is used as the heat source, with a natural gas flow of 3.5 L/min and an oxygen flow of 7 L/min. Tow acetylene #7 burners with spacing of 120 mm are used to heat a 19 mm diameter copper tube to 600° C. with a swinging distance of 10 mm. The heating time is 9 seconds. The photos of color changes of the copper tube surface after cooling are shown in FIG. 4(*c*).

Comparative Example 4

On an automatic flame brazing apparatus, a flame generated from the combustion of natural gas and oxygen is used as the heat source, with a natural gas flow of 5 L/min and an oxygen flow of 7.5 L/min. An aluminum-silicon-copper flux-cored wire, and copper-aluminum brazing paste are used. Four acetylene #7 burner with appropriate spacing are used to braze a 19 mm diameter copper tube to an aluminum base with a swinging distance of 10 mm. The copper tube is preheated for 7 seconds, the aluminum base is preheated for 12 seconds, and the wire feeding and welding time is 5 seconds, totally 24 seconds.

Example 3

On an automatic flame brazing apparatus, a flame generated from the combustion of natural gas, air, and oxygen is used as the heat source, with four air burners. The natural gas flow is set to 7 L/min, the air flow is set to 140 L/min, and the oxygen flow is set to 14 L/min, the copper tube is preheated for 5 seconds. Then immediately switched to the natural gas flow of 7 L/min, the air flow of 140 L/min, and the oxygen flow of 7 L/min, the aluminum base is preheated for 13 seconds. Then immediately switched to the natural gas flow of 7 L/min, the air flow of 140 L/min, and the oxygen flow of 5.6 L/min, perform wire feeding and welding for 5.5 seconds, An aluminum-silicon-copper flux-cored wire, and copper-aluminum brazing paste are used. Four burners with appropriate spacing are used to braze a 19 mm diameter copper tube to an aluminum base with a swinging distance of 10 mm.

Weldments obtained by the above examples and comparative examples are detected, the test results of the welding quality and qualified rates are shown in the table below.

| Heating mode | Qualified rate | Welding quality |
|---|---|---|
| Natural gas + oxygen + air Air burner | 99.2% | The brazing filler is filled uniformly and fully, the aluminum component is less in burning loss, and the copper component is qualified. |
| Natural gas + air Air burner | 99.3% | The brazing filler is filled uniformly and fully, the aluminum component is less in burning loss, the copper component is oxidized severely and cannot meet the quality requirement, and the copper tube become grain coarsening. |
| Natural gas + oxygen acetylene#7 burner | 94.8% | The aluminum component is burnt loss, the brazing filler penetration is uneven, and the surface appearance of the copper tube is good. |

Note: the issue of copper tube blackening is not taken into account in the qualified rate of the heating mode of natural gas+oxygen.

By comparing the three combustion-assisted heating modes, the oxygen-assisted heating mode is prone to burning the aluminum component, resulting in a lower qualified rate. The air-assisted heating mode shows relatively good welding qualified rate in the welding area but has a lower production efficiency, and the copper tube exhibit severe blackening, not meeting quality requirements. The air+ oxygen-assisted heating mode combines the advantages of pure oxygen-assisted and pure air-assisted modes. It achieves an overall improvement in welding qualified rate, production efficiency and copper tube quality, better meeting the requirements.

For welding different copper and aluminum components, it is necessary to adjust and experiment with different oxygen and air contents to find suitable parameters in practical applications.

Figure 5:
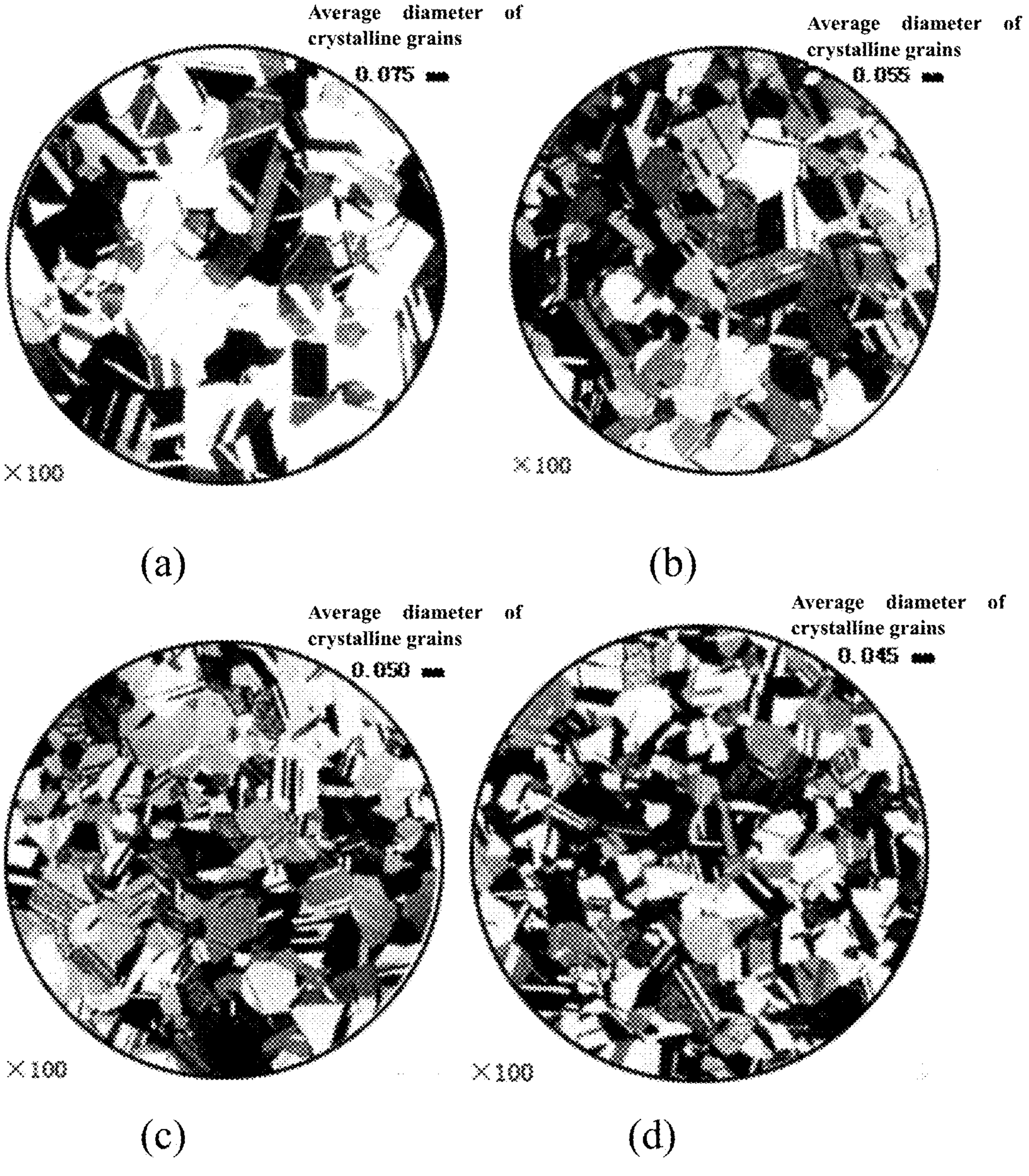
FIG. 5 shows photos of the crystallographic morphology of a copper component after copper-aluminum welding using different combustion-assisting gases.

FIG. 5 shows SEM morphological photos of copper sample from the examples and the comparative examples, wherein FIG. 5(*a*) is a sample photo from the comparative example 2 with air-assisted heating, FIG. 5(*b*) is a sample photo from the example 2 with air+oxygen-assisted heating, FIG. 5(*c*) is a sample photo from the example 3 with air+oxygen-assisted heating, and FIG. 5(*d*) is a sample photo from the comparative example 3 with oxygen-assisted heating. By comparing the SEM photos of the copper tube samples, it can be observed that air-assisted heating leads to significant grain coarsening and decreased quality, while air+oxygen-assisted heating of the present invention results in relatively minor changes in the crystal structure, meeting the quality requirements. When using air+oxygen-assisted heating, employing a higher oxygen-to-natural gas molar flow ratio during preheating can further reduce the grain coarsening of copper tube, enhance welding quality, and increase welding efficiency.

By employing the flame brazing control method and automatic welding apparatus of the present invention for copper-aluminum welding, the defects of excessive or insufficient burning of aluminum components and uneven penetration of the brazing filler in copper-aluminum flame brazing are overcome, and enhances welding quality, welding qualified rate, and welding efficiency, achieving a pass rate of over 99%.

The above description only represents preferred embodiments of the present invention, and the scope of protection of the present invention is not limited to the above embodiments. It should be noted that for those skilled in the art in this technical field, various modifications and adjustments that do not depart from the principles of the present invention should also be considered within the scope of protection of the present invention.

What is claimed:

1. A flame brazing control method for copper-aluminum brazing, characterized by using a flame generated from combustion of natural gas, air, and oxygen as three gases, wherein a molar flow ratio of the natural gas, the air, and the oxygen is controlled within a range of 1:10-22:0.3-2.2 respectively in a flow controller prior to mixing the three gases in a mixer.

2. The flame brazing control method of claim 1, wherein a higher molar flow ratio of the oxygen to the natural gas is adopted during preheating compared to brazing.

3. The flame brazing control method of claim 2, wherein the molar flow ratio of the natural gas, the air, and the oxygen is controlled within a range of 1:15-22:1-2.2, during preheating of aluminum components, the molar flow ratio is controlled within a range of 1:10-22:0.3-1.5, and during brazing, the molar flow ratio is controlled within the range of 1:10-22:0.3-1.5.

4. The flame brazing control method of claim 3, wherein the molar flow ratio is set as follows: 1:20:2 for preheating copper components, 1:20:1 for the preheating of the aluminum components, and 1:20:0.8 during the brazing.

* * * * *